(12) United States Patent
Duplaix

(10) Patent No.: US 10,909,722 B2
(45) Date of Patent: Feb. 2, 2021

(54) CALIBRATION PATTERN FOR AN IMAGING SYSTEM

(71) Applicant: VIT, Saint-Egreve (FR)

(72) Inventor: François Duplaix, Saint-Egreve (FR)

(73) Assignee: VIT, Saint-Egreve (FR)

( * ) Notice: Subject to any disclaimer, the term of this patent is extended or adjusted under 35 U.S.C. 154(b) by 36 days.

(21) Appl. No.: 16/304,934

(22) PCT Filed: Jun. 23, 2017

(86) PCT No.: PCT/FR2017/051686
§ 371 (c)(1),
(2) Date: Nov. 27, 2018

(87) PCT Pub. No.: WO2018/002493
PCT Pub. Date: Jan. 4, 2018

(65) Prior Publication Data
US 2020/0202568 A1    Jun. 25, 2020

(30) Foreign Application Priority Data

Jun. 27, 2016    (FR) ..................... 16 55980

(51) Int. Cl.
| | | |
|---|---|---|
| *G06T 7/80* | (2017.01) | |
| *G06T 7/33* | (2017.01) | |
| *G06T 7/00* | (2017.01) | |
| *G01N 21/88* | (2006.01) | |
| *G01N 21/95* | (2006.01) | |
| *G02B 27/32* | (2006.01) | |

(52) U.S. Cl.
CPC ........... *G06T 7/80* (2017.01); *G01N 21/8851* (2013.01); *G01N 21/9501* (2013.01); *G02B 27/32* (2013.01); *G06T 7/001* (2013.01); *G06T 7/337* (2017.01); *G01N 2021/8887* (2013.01); *G06T 2207/30141* (2013.01)

(58) Field of Classification Search
CPC ........... G06T 7/80; G06T 7/337; G06T 7/001; G01N 21/8851; G01N 21/9501; G02B 27/32
See application file for complete search history.

(56) References Cited

U.S. PATENT DOCUMENTS

| | | | |
|---|---|---|---|
| 4,528,444 A | 7/1985 | Hara et al. | |
| 5,471,043 A | 11/1995 | Knapp et al. | |
| 6,915,007 B2 | 7/2005 | Beaty et al. | |
| 2013/0178689 A1* | 7/2013 | Jung | A61N 5/1077 600/1 |

(Continued)

FOREIGN PATENT DOCUMENTS

| | | |
|---|---|---|
| CN | 202688645 U | 1/2013 |
| CN | 203620929 U | 6/2014 |

(Continued)

OTHER PUBLICATIONS

Machine Translation of JP2009274335 (Year: 2009).*

(Continued)

*Primary Examiner* — Utpal D Shah
(74) *Attorney, Agent, or Firm* — Moreno IP Law LLC

(57) ABSTRACT

The invention concerns a calibration target (30) of an optical system, formed of a plate (32) comprising through holes (38).

12 Claims, 2 Drawing Sheets

(56) References Cited

U.S. PATENT DOCUMENTS

2017/0319160 A1* 11/2017 Lu .......................... A61B 6/06

FOREIGN PATENT DOCUMENTS

JP          H0461252 A       2/1992
JP          2009274335 A  *  11/2009

OTHER PUBLICATIONS

W. Li et al., "Camera calibration of the Stereo vision measuement system," Proc. of SPIE, vol. 7018 (2008), 11 pages.
S. Laguela et al., "High performance grid for metric calibration of thermographic cameras," Meas. Sci. Technol. 23(2012) 015402, 9 pages.
International Search Report for International Application No. PCT/FR2017/051686 dated Oct. 10, 2017, 3 pages.
Written Opinion of the International Searching Authority for International Application No. PCT/FR2017/051686 dated Nov. 3, 2018, 8 pages.

* cited by examiner

CALIBRATION PATTERN FOR AN IMAGING SYSTEM

CROSS-REFERENCE TO RELATED APPLICATION

The present patent application claims the priority benefit of French patent application FR16/55980 which is herein incorporated by reference.

FIELD

The present disclosure generally relates to image capture installations and, more specifically, to installations of optical inspection, for example, of electronic boards. The present description relates to a calibration target for such an image capture installation.

BACKGROUND

An optical inspection installation and more generally an image capture installation may supply first data and second data of different natures during the inspection of a same scene. As an example, the optical inspection installation may supply a three-dimensional image of the scene and a two-dimensional image in color levels of the scene. According to another example, the optical inspection installation may supply a first three-dimensional image of the scene by using cameras and a second three-dimensional image of the scene by using a laser scan.

It may be desirable to be able to combine first and second data of different natures relative to a same scene. The first data and the second data should then be able to be matched.

For this purpose, a calibration target may be used. Such a target comprises elements which are easily non-ambiguously detectable when the target is inspected to supply the first and second data. Such elements are called invariant elements. The invariant elements detected in the first data are then matched with the invariant elements detected in the second data.

It is known to provide grooves or raised pads on the calibration target as invariant elements. However, the detection of such invariant elements in the first and second data may not necessarily always be non-ambiguously carried out. The matching of the first and second data may then be inaccurate.

SUMMARY

Thus, an object of an embodiment is to at least partly overcome the disadvantages of calibration targets for the previously-described image capture installation.

An object of an embodiment is to provide a calibration target adapted to image capture installations, particularly, to optical inspection installations.

Another object of an embodiment is a calibration target comprising elements non-ambiguously detectable by different image acquisition systems.

Another object of an embodiment is a calibration target that can be formed at a decreased cost.

Thus, an embodiment provides a calibration target of an optical system, formed of a plate comprising through holes.

According to an embodiment, the plate comprises first and second opposite surfaces, each hole crossing the plate from the first surface to the second surface.

According to an embodiment, the cross-section of at least one of the holes increases from the first surface to the second surface.

According to an embodiment, at least one of the holes is a tapered hole.

According to an embodiment, at least one of the holes comprises a first cylindrical portion continued by a second cylindrical portion, the diameter of the first cylindrical portion being smaller than the diameter of the second cylindrical portion.

According to an embodiment, the target is applied to a calibration of an installation of optical electronic board inspection.

An embodiment also provides an optical system comprising a first two-dimensional or three-dimensional image acquisition system and a second image acquisition system and a calibration target such as previously defined.

An embodiment also provides a method of calibrating the optical system, using a target such as previously defined, comprising the steps of:

acquisition of a first image of the target by a first image acquisition system;

acquisition of a second image of the target by a second image acquisition system;

determination of first landmarks in the first image, each first landmark being associated with the representation of one of the holes of the target in the first image;

determination of second landmarks on the second image, each second landmark being associated with the representation of one of the holes of the target on the second image; and matching of the first landmarks with the second landmarks.

According to an embodiment, the method comprises determining a transformation function capable of matching, with each point of the first image, a point of the second image.

According to an embodiment, the first surface of the target is directed towards the first image acquisition system and the second image acquisition system.

According to an embodiment, the first image acquisition system is capable of detecting a first signal, the holes of the target appearing in the first image as a lack of detection of the first signal by the first image acquisition system and the second image acquisition system is capable of detecting a second signal, the holes of the target appearing on the second image as a lack of detection of the second signal by the second image acquisition system.

BRIEF DESCRIPTION OF THE DRAWINGS

The foregoing and other features and advantages will be discussed in detail in the following non-limiting description of specific embodiments in connection with the accompanying drawings, among which.

DETAILED DESCRIPTION OF THE PRESENT EMBODIMENTS

Figure 1:
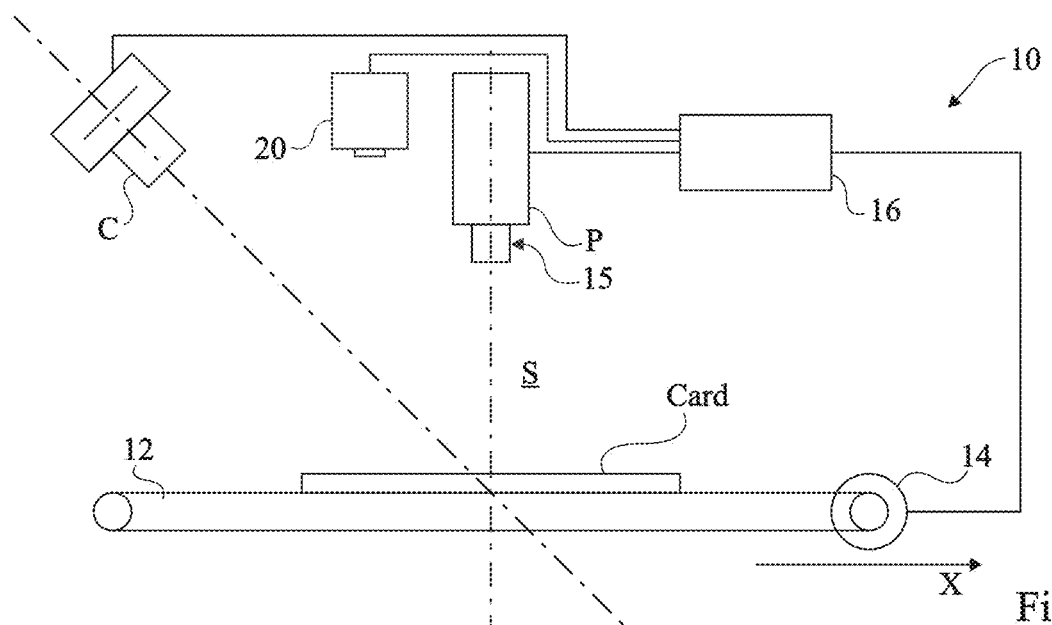
FIG. 1 partially and schematically shows an embodiment of an electronic circuit optical inspection installation.

The same elements have been designated with the same reference numerals in the different drawings. For clarity, only those steps and elements which are useful to the understanding of the embodiments which will be described have been shown and are detailed. In particular, the optical inspection methods have not been detailed, the calibration target being compatible with any optical inspection installation and, more generally, with any image capture installation. Unless otherwise specified, expressions "approximately", "substantially", and "in the order of" mean to within 10%, preferably to within 5%. In the following description, three-dimensional image or 3D image of an object designates a cloud of points, for example, comprising several million points, of at least a portion of the external surface of the object, where each point of the surface is located by means of its coordinates determined with respect to a three-dimensional space reference system. Further, two-dimensional image, or 2D image, is used to designate a digital image acquired by a camera and corresponding to a pixel array.

FIG. 1 partially and schematically shows an embodiment of an optical inspection installation 10, for example, for electronic circuit boards. Each electronic circuit Card is placed on a conveyor 12, for example, a planar conveyor. Conveyor 12 is capable of displacing circuit Card along a direction X, for example, a horizontal direction to take it to a region of the optical inspection installation, called scene S, where images of circuit Card may be acquired. As an example, conveyor 12 may comprise an assembly of straps and of rollers driven by a rotating electric motor 14. As a variation, conveyor 12 may comprise a linear motor displacing a carriage supporting electronic circuit Card. Circuit card for example corresponds to a rectangular card having a length and a width varying from 50 mm to 550 mm. As a variation, the displacement direction of circuit Card may be a horizontal direction perpendicular to direction X shown in FIG. 1.

In normal operation, installation 10 comprises at least first and second different sensors of observation of the card Card present in scene S and determines, based on signals supplied by the first and second sensors, first and second data of different natures used for the inspection of card Card present in scene S. As an example, the first sensor is a camera and the second sensor is a laser scanner. The first data may correspond to a three-dimensional image or to a two-dimensional image determined based on the signals supplied by the first sensor and the second data may correspond to a three-dimensional image or to a two-dimensional image determined based on the signals supplied by the second sensor.

According to an embodiment, system 10 comprises a first system 15 of acquisition of images of circuit Card. As an example, the first image acquisition system 15 comprises an image projection device P comprising at least one projector, a single projector P being shown in FIG. 1. When a plurality of projectors P are present, projectors P may be substantially aligned along a direction perpendicular to direction X. First acquisition system 15 further comprises an image acquisition device C comprising at least one digital camera, a single camera C being shown in FIG. 1. When a plurality of cameras C are present, cameras C may be substantially aligned, for example, in groups of cameras, preferably along a direction perpendicular to direction X and/or may be arranged on either side of projector(s) P. As an example, each camera C may comprise an array of photodetectors distributed in rows and in columns. Each photodetector is capable of supplying a detection signal representative of the quantity of light that it has received during an exposure time.

As an example, projector P and camera C are coupled to a processing unit 16 and first acquisition system 15 is controlled by processing unit 16. According to an embodiment, processing unit 16 is capable of supplying a three-dimensional image or a two-dimensional image of card Card present in scene S based on the two-dimensional images supplied by camera C while images are projected on circuit Card by projector P.

According to another embodiment, first acquisition system 15 comprises no projector and comprises at least one camera, for example, a telecentric camera, arranged vertically in line with scene S, for example, at the location of projector P in FIG. 1, and coupled to processing unit 16.

Processing unit 16 may comprise a computer or a microcontroller comprising a processor and a non-volatile memory having instruction sequences stored therein, the execution thereof by the processor enabling processing unit 16 to carry out the desired functions. As a variation, processing unit 16 may correspond to a dedicated electronic circuit. Electric motor 14 is further controlled by processing unit 16.

Optical inspection installation 10 may comprise a second image acquisition system 20. According to an embodiment, the second image acquisition system 20 comprises a laser scanner. As an example, laser scanner 20 is coupled to processing unit 16 and second acquisition system 20 is controlled by processing unit 16. According to an embodiment, processing unit 16 is capable of supplying a three-dimensional image of card Card present in scene S based on the signal provided by laser scanner 20.

The means for controlling previously-described conveyor 12, camera C, and projector P, laser scanner 20 of optical acquisition installation 10 are within the abilities of those skilled in the art and are not described in further detail.

To calibrate optical inspection installation 10, a target which is arranged in scene S instead of an electronic board is used.

Figure 2:
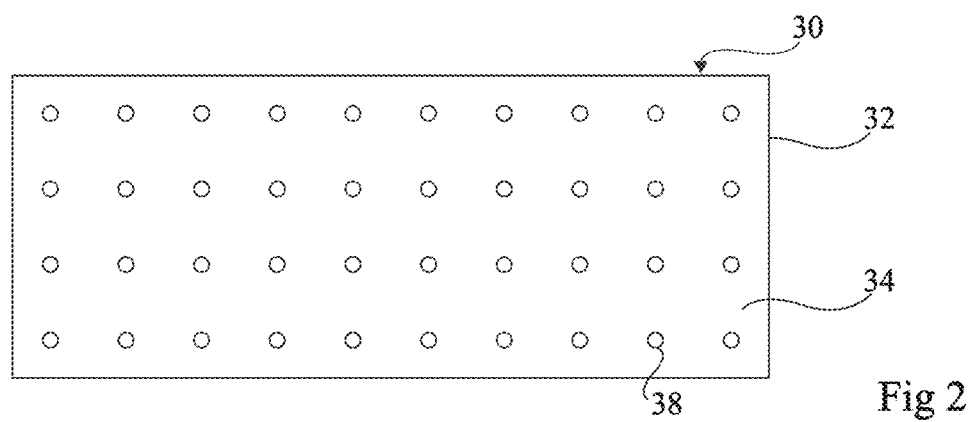
FIG. 2 is a simplified top view of an embodiment of a calibration target.

FIG. 2 is a simplified top view of an embodiment of a calibration target 30. Calibration target 30 comprises a plate 32 having two opposite surfaces 34 and 36, surface 36 being invisible in FIG. 2. Surfaces 34 and 36 are preferably substantially planar and parallel. Plate 32 is pierced with holes 38 crossing the plate from surface 34 to surface 36 and emerging onto the two surfaces 34, 36. Surface 34 of plate 32 is the surface which is intended to be observed by acquisition systems 15, 20 of optical inspection installation 10 during a calibration operation. Holes 38 may be distributed in rows and in columns. However, another arrangement of holes 38 may be provided, holes 38 being for example arranged in quincunx. Plate 32 may comprise from three to several thousand holes 38. The thickness of plate 32 may be in the range from 1 millimeter to 20 millimeters, according to the material used. The interval between two adjacent holes 38 of a same row may be in the range from 1 millimeter to 20 millimeters. The material forming plate 32 may be selected from the group comprising a metal, a metal alloy, a plastic material, or a composite material.

According to an embodiment, target 30 may manufactured by drilling holes 38 into plate 32 by means of a drilling tool.

Figure 3:
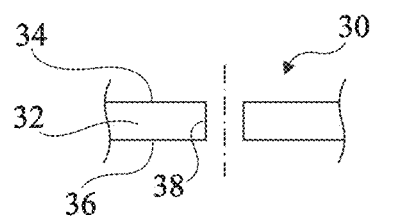
FIGS. 3 to 5 are cross-section views of embodiments of a hole of the target of FIG. 2.

FIG. 3 is a partial simplified cross-section view of calibration target 30 at the level of one of holes 38 and illustrates an embodiment of holes 38 where holes 38 have a substantially constant cross-section across the entire thickness of wafer 32. According to an embodiment, holes 38 are cylindrical with a circular base. The diameter of each hole 38 may be in the range from 1 millimeter to 10 millimeters. Preferably, all holes 38 have substantially the same diameter.

According to another embodiment, holes 38 have a cross-section which is not constant across the entire thickness of plate 32 and which increases from surface 34 to surface 36.

Figure 4:
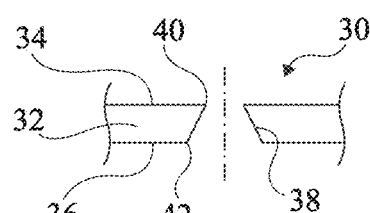

FIG. 4 is a view similar to FIG. 3 of another embodiment of holes 38 of target 30 where holes 38 are substantially tapered, for example, with a circular base. Each hole 38 then comprises a circular opening 40 on surface 34 and a circular opening 42 on surface 36, the diameter of circular opening 40 being smaller than the diameter of circular opening 42. The diameter of the circular opening 40 of each hole 38 may be in the range from 1 millimeter to 10 millimeters and the diameter of the circular opening 42 of each hole 38 may be in the range from 2 millimeters to 20 millimeters.

Figure 5:
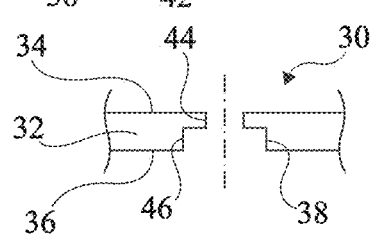

FIG. 5 is a view similar to FIG. 3 of another embodiment of holes 38 of target 30 where each hole 38 is counterbored and comprises a first cylindrical portion 44 with a circular base which is continued by a second cylindrical portion 46 having a circular base. First cylindrical portion 44 emerges onto surface 34 and second cylindrical portion 46 emerges onto surface 36. The diameter of first cylindrical portion 44 is smaller than the diameter of second cylindrical portion 46. The diameter of first cylindrical portion 44 may be in the range from 1 millimeter to 10 millimeters and the diameter of second cylindrical portion 46 may be in the range from 2 millimeters to 20 millimeters. Further, the thickness of first cylindrical portion 44 may be in the range from 0.4 millimeter to 5 millimeters.

The cross-section of each hole 38 may be different from a circle and may be polygonal, particularly, square or triangular. An advantage of providing holes 38 of circular, constant, or variable cross-section, is that target 30 may be manufactured simply and at a low cost.

During a calibration operation, target 30 is not pressed against a support, so that holes 38 of the target are not obstructed.

Figure 6:
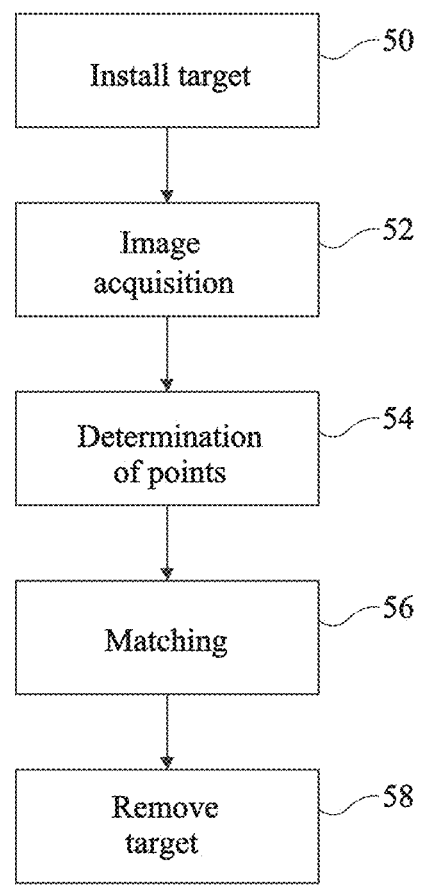
FIG. 6 is a block diagram illustrating an embodiment of a method of matching data of different natures supplied by the optical inspection installation of FIG. 1.

FIG. 6 is a block diagram illustrating an embodiment of a method of calibration of the optical inspection installation 10 shown in FIG. 1. The calibration method may be implemented at the end of the manufacturing of optical inspection installation 10 or after a displacement of optical inspection installation 10.

The method comprises successive steps 50, 52, 54, 56, and 58.

At step 50, calibration target 30 is placed in scene S, for example, by means of conveyor 12.

At step 52, at least one first image of target 30 is determined by processing unit 16 based on the signals supplied by first image acquisition system 15 and a second image of target 30 is determined by processing unit 16 based on the signals supplied by second image acquisition system 20. Target 30 may be displaced in scene S between the activation of first image acquisition system 15 and the activation of second image acquisition system 20. Preferably, target 30 is entirely shown in the first and second images. As a variation, only a portion of target 30 may be present on at least one of the first and second images. However, in this case, at least one corner of target 30 is preferably shown in this image.

Image acquisition systems 15, 20 are capable of acquiring an image by detection of the intensity of a radiation reflected by target 30. It may be a radiation projected on target 30 by the image acquisition system and reflected by target 30 or the reflection of ambient light by target 30. Holes 38 of target 30 appear on the image acquired by each image acquisition system as areas where there is no detection of a radiation since no radiation is reflected by holes 38.

Figure 7:
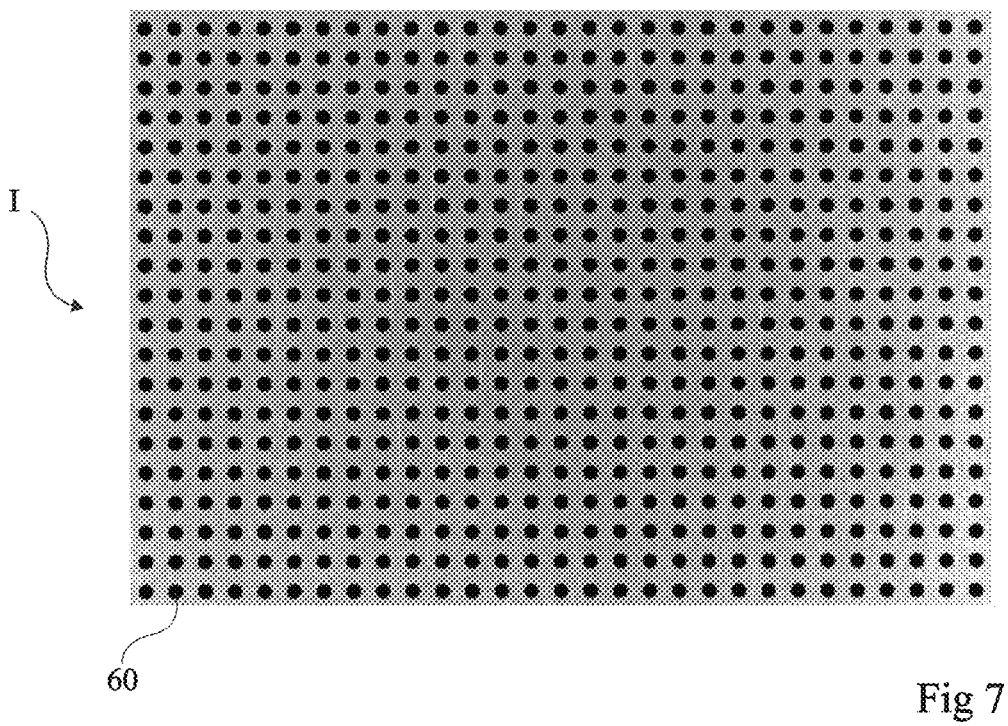
FIG. 7 shows an example of an image of a target captured by a camera.

FIG. 7 shows an example of an image I of target 30 obtained by a camera in the case where target 30 comprises cylindrical or tapered holes 38. Holes 38 appear in image I as disks 60 having a saturated color or a saturated grey level, for example, black disks. Preferably, the portion of surface 34 of target 30 around each hole 38 is light-colored to increase the contrast of the image acquired at the level of each disk 60, and thus ease the identification of holes 38.

In the embodiments shown in FIGS. 4 and 5, the cross-section of holes 38 increases away from the surface 34 of target 30 observed by each image acquisition system 15, 20. This advantageously enables to avoid for the edges of holes 38 at the level of surface 34 to appear on the image determined by processing unit 16 from the signals supplied by image acquisition system 15, 20, in particular when the viewing angle of image acquisition system 15, 20 is not perpendicular to surface 34 of target 30.

At step 54, for each image I, processing unit 16 determines for each disk 60 the coordinates of a point, called landmark in the following description, representative of disk 60 in the coordinate system associated with image I. According to an embodiment, the landmark corresponds to the barycenter of the pixels of the image belonging to disk 60.

At step 56, processing unit 16 associates, with each landmark of the first image of target 30 determined by processing unit 16, the landmark corresponding to the second image of target 30 determined by processing unit 16. Processing unit 16 then determines a transformation function enabling to pass from the coordinates of any point in the first image of target 30 in the coordinate system of the first image to the coordinates of the corresponding point of the second image of target 30 in the coordinate system of the second image and which meets the constraint according to which to the coordinates of each landmark in the first image of target 30 in the coordinate system of the first image correspond to the coordinates of the corresponding landmark of the second image of target 30 in the coordinate system of the second image. The transformation function may be obtained by any type of extrapolation method. As an example, the transformation function is an affine transformation. The greater the number of landmarks used to determine the transformation function, the better the matching of any point in the first image of target 30 in the coordinate system of the first image with the coordinates of the corresponding point of the second image of target 30 in the coordinate system of the second image by the transformation function can be obtained.

At step 58, target 30 is removed from scene S.

An advantage of the use of calibration target 30 is that it does not require previously knowing the position of target 30 on scene S, the shape of holes 38, or the number of holes 38 of target 30.

During the normal operation of optical inspection installation 10, the previously-described transformation function may be used to express in a common reference frame information determined from the two image acquisition systems 15, 20.

Specific embodiments have been described. Various alterations and modifications will occur to those skilled in the art. In particular, although embodiments have been described for a specific optical inspection installation structure 10, calibration target 30 may be used with any type of optical inspection installation 10 of an object as soon as optical inspection installation 10 supplies first and second data originating from different sensors during an operation of inspection of the object.

What is claimed is:

1. An optical system comprising a first two-dimensional or three-dimensional image acquisition system and a second image acquisition system and a calibration target form of plate comprising first and second opposite surfaces and comprising through holes, the cross-section of at least one of the holes increasing from the first surface to the second surface,
   wherein the first surface of the target is directed towards the first image acquisition system and the second image acquisition system,
   wherein the first image acquisition system is capable of detecting a first signal, the holes of the target appearing in the first image as a lack of detection of the first signal by the first image acquisition system and wherein the second image acquisition system is capable of detecting a second signal, the holes of the target appearing in the second image as a lack of detection of the second signal by the second image acquisition system, and
   wherein a viewing angle of the first image acquisition system is not perpendicular to the first surface of the target and a viewing angle of the second image acquisition system is not perpendicular to the first surface of the target.

2. The optical system of claim 1, wherein each hole crosses the plate from the first surface to the second surface.

3. The optical system of claim 1, wherein at least one of the holes is a tapered hole.

4. The optical system of claim 1, wherein at least one of the holes comprises a first cylindrical portion continued by a second cylindrical portion, the diameter of the first cylindrical portion being smaller than the diameter of the second cylindrical portion.

5. The optical system of claim 1, applied to a calibration of an installation of optical inspection of electronic boards.

6. A method of calibrating an optical system using a calibration target formed of a plate comprising first and second opposite surfaces and comprising through holes, the cross-section of at least one of the holes increasing from the first surface to the second surface, the method comprising the steps of:
   acquisition of a first image of the target by a first image acquisition system;
   acquisition of a second image of the target by a second image acquisition system;
   determination of first landmarks in the first image, each first landmark being associated with the representation of one of the holes of the target in the first image;
   determination of second landmarks in the second image, each second landmark being associated with the representation of one of the holes of the target in the second image; and
   matching of the first landmarks with the second landmarks,
   wherein the first surface of the target is directed towards the first image acquisition system and the second image acquisition system,
   wherein the first image acquisition system is capable of detecting a first signal, the holes of the target appearing in the first image as a lack of detection of the first signal by the first image acquisition system and wherein the second image acquisition system is capable of detecting a second signal, the holes of the target appearing in the second image as a lack of detection of the second signal by the second image acquisition system, and
   wherein a viewing angle of the first image acquisition system is not perpendicular to the first surface of the target and a viewing angle of the first image acquisition system is not perpendicular to the first surface of the target.

7. The method of claim 6, comprising determining a transformation function capable of matching, with each point of the first image, a point of the second image.

8. The method of claim 6, wherein at least one of the holes is a tapered hole.

9. The method of claim 6, wherein each hole crosses the plate from the first surface to the second surface.

10. The method of claim 6, wherein at least one of the holes is a tapered hole.

11. The method of claim 6, wherein at least one of the holes comprises a first cylindrical portion continued by a second cylindrical portion, the diameter of the first cylindrical portion being smaller than the diameter of the second cylindrical portion.

12. The method of claim 6, applied to a calibration of an installation of optical inspection of electronic boards.

* * * * *